June 30, 1959     E. BAUMANN ET AL     2,892,380
ARRANGEMENT FOR AMPLIFYING THE LIGHT INTENSITY
OF AN OPTICALLY PROJECTED IMAGE
Filed Jan. 16, 1956
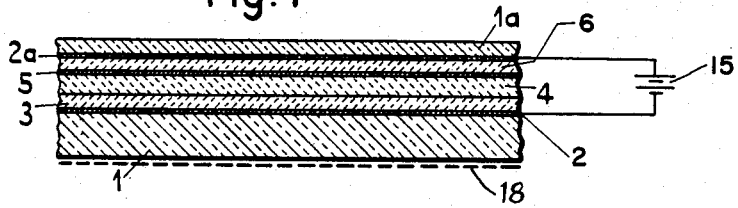
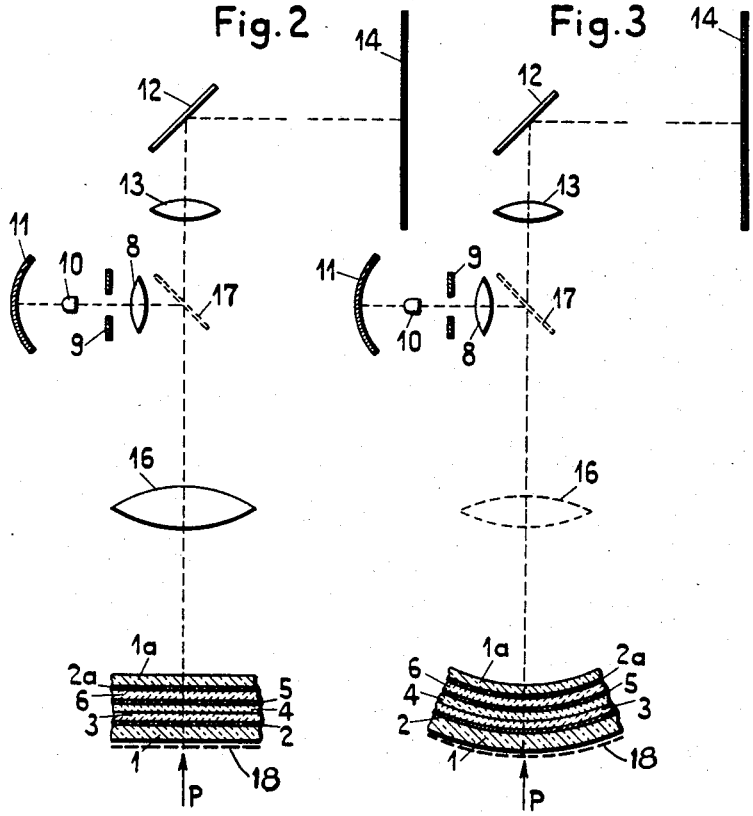
Inventors:
Ernst Baumann and
Fred Mast,
By Pierce, Scheffler & Parker
their Attorneys

United States Patent Office 2,892,380
Patented June 30, 1959

2,892,380

ARRANGEMENT FOR AMPLIFYING THE LIGHT INTENSITY OF AN OPTICALLY PROJECTED IMAGE

Ernst Baumann and Fred Mast, Zurich, Switzerland, assignor to Gesellschaft zur Förderung der Forschung an der Eidg. Technischen Hochschule, Zurich, Switzerland Application January 16, 1956, Serial No. 559,351

Claims priority, application Switzerland January 18, 1955

3 Claims. (Cl. 88—61)

Up to the present the following basic methods have been in existence for increasing the light intensity of a projected image:

(1) Photography with subsequent projection.
(2) Televising the image with pickup unit and suitable reproduction system.
(3) Electronic image converter.

The invention relates to arrangements to the type in which a multiple layer control means in a schlieren-optical system modulates the light of a separate source of light. Such control devices are as to their fundamental lines described, for instance in the Swiss patent specifications 230,613 and 224,686 and also United States Letters Patent Nos. 2,391,450 and 2,391,451, Fischer; and No. 2,644,938, Hetzel et al.

Whereas in the arrangement and methods of the aforementioned kind the forces necessary for deforming the multiple layer control means are brought about by electric charges applied to its surface, according to the present invention a novel multiple layer control means is proposed which, in its essence, includes a combination of a photo-conductive layer with a layer of a substance with electric Kerr effect, i.e. a substance having an optimum index of refraction variable by an electric field, as well as a mirror layer.

Further features of the invention will appear from the claims, specification and drawing, the latter representing diagrammatically and not to scale some preferred forms of the arrangement incorporating the invention.

Fig. 1 is a sectional view of a formation of the control layer;

Fig. 2 represents the general arrangement with a flat control layer according to Fig. 1;

Fig. 3 shows the general arrangement with a hollow spherically shaped control layer in the formation according to Fig. 1.

According to the embodiment as in Fig. 1, a glass carrier 1 has applied thereto an electrode 2 of a transparent, electrically conducting thin metallic layer of, say, platinum. On this electrode 2 there is a special photoconductive layer 3 of, say, selenium with copper activated zinc sulphide and so on, of suitable thickness, for example 50μ, applied in the well known manner as by vacuum evaporation or sedimentation process. On said layer 3 is a thin light-absorbing and electrically insulating layer 4 having in turn an electrically non-conductive mirror such as, for example, an interference mirror layer 5 applied thereto. If the transparency of the interference mirror 5 is very poor, i.e. if practically no light at all is able to pass through the mirror layer 5, the arranging of an interlayer 4 may be dispensed with; in such case the mirror layer 5 is directly applied to the photo-conductive layer 3. The function of the electrically non-conductive mirror layer 5 is to separate the controlling light from the controlled light. Over the mirror layer 5 is poured a layer 6 of a substance having an electric Kerr effect; this layer 6 may include a liquid, say, nitrobenzene, or substance forming crystals, such as para-azoxyanisol. The layer 6 may also include a solid body, say, mono-potassium phosphate or mono-ammonium phosphate. As is known, the layer 6 has an optimum index of refraction which is variable when subjected to a variable electric field. Over the layer 6 is a glass plate 1a provided with an electrode layer 2a facing the layer 6 (Fig. 1). The multiple layer control means formed by the various layers is hardly more than 7 mm. thick. Thus the mirror layer 5 is located between the photo-conductive layer to which the controlling light is applied, and the layer 6 with the electric Kerr effect through which the controlled light from the light source 10 passes to the mirror layer and is reflected by the same through layer 6.

The layers may be arranged flat (Figs. 1 and 2) as well as in convex form, say, as hollow spherical segment (Fig. 3). The glass plate 1 and, in given cases, also glass plate 1a may be provided for cooling, say, by placing the carrier or glass plate in a water bath under cold water circulation, or by having it air-cooled by blower.

The action as to the whole arrangement is explained hereafter. The schlieren-optical system according to Fig. 3 comprising schlieren-objective 16, bar system 17, condenser lens 8, image window 9 and light source 10 (say, arc lamp) with a reflector 11 is provided in such a way that with homogeneous electric field in the layer 6, all light from source 10 and reflected by bars 17 through lens 16 to the mirror layer 5 are reutrned by reflection from mirror layer 5 to the bars 17 and back to the source 10 so that no light impinges between the bars 17 on the mirror 12 and consequently on the projection surface 14. Applied to the electrodes 2 and 2a of the aforedescribed control layer is a direct or an alternating voltage of any frequency, indicated by battery 15, which establishes the electric field therebetween through layers 3, 4, 5 and 6. Thus the reason for making the mirror layer from an electrically non-conductive material is to prevent it from adversely affecting the desired local variations in the index of refraction of the layer 6 corresponding to like positioned local variations in the resistance of the photo-conductive layer 3 caused by point-to-point variations in light intensity of the image rastered, i.e. projected in a point-by-point manner, upon layer 3. If then light, coming from the direction of the arrow P, falls on a portion of the multiple layer control means, the resistance or dielectric constant thereof between electrodes 2 and 2a and hence the field intensity will be altered in layer 6. Due to the inhomogeneous electric field set up, the refraction index in layer 6 will be changed. At this place the arc lamp light will be broken or diffracted so that part thereof falls through slits of the bar system 17 on the mirror 12 and therefore on the projection surface 14. For accurately imaging the mirror layer 5 on the screen 14, a correcting lens 13 is inserted.

This arrangement allows of controlling the arc lamp light point-by-point. Incidentally it should be noted that the image projected on the photo-conductive layer 3 must be rastered in order to obtain an equivalent image on the screen 14. This may take place in various ways, for instance immediately in front of the photo-conductive layer 3 or at another optically equivalent point by means of an optical grid 18.

Fig. 3 shows a modified general arrangement, where, in contradistinction to the arrangement as in Fig. 2, the multiple layer control means is designed hollow spherically, and therefore the schlieren objective 16 in the schlieren channel (and hence disturbing glass surfaces) may be done away with.

As compared with multiple layer control means such as have already been proposed, the multiple layer control means according to the present invention has the advantage that all layers employed may be prepared comparatively easily and of satisfactory optical quality in their surface.

The invention provides an arrangement which depends on the use of new principles adapted to ensure a light-control point-by-point. The various applications include the following: Episcopic projection, large-scale television projection, cinematographic projection with great light intensity, image converters.

What we claim is:

1. Apparatus for amplifying the light from an optically projected image comprising a separate light source, means forming the light from said source into a beam, a system for projecting said beam to a screen, a multiple layer control means interposed in said system for modulating said beam in a point-to-point manner, said multiple layer control means comprising a first electrically non-conductive mirror layer, a second layer disposed at one side of said mirror layer, said second layer being made from a substance having an optimum index of refraction variable by variation of an electric field established therein, said light beam being first passed through said second layer of said mirror layer and then reflected back through said second layer, a third layer having a photo-conductive characteristic disposed at the other side of said mirror layer, a pair of spaced electrode layers permeable to light and between which said first, second and third layers are located, means for applying a voltage between said electrode layers thereby to establish an electric field in said second layer, and means for projecting in a point-to-point manner said light image to be amplified onto the side of said third layer opposite to that facing said mirror layer to thereby effect a corresponding point-to-point variation in the electric field in, and also the index of refraction of, said second layer.

2. Apparatus as defined in claim 1 and wherein a light absorbing electrically non-conductive layer is disposed between said photo-conductive layer and said mirror layer for absorbing any light from said beam which may be passed through rather than reflected by said mirror layer.

3. Apparatus as defined in claim 1 and wherein said mirror layer is an interference mirror.

References Cited in the file of this patent

UNITED STATES PATENTS

| 2,169,838 | Herbct | Aug. 15, 1939 |
| 2,301,743 | Nagy et al. | Nov. 10, 1942 |

FOREIGN PATENTS

| 1,075,866 | France | Apr. 14, 1954 |

OTHER REFERENCES

Hackh's Chemical Dictionary, 3rd ed., 1944 (1946 printing), The Blakiston Co., Philadelphia, Pa., page 468.

"A Solid-State Image Intensifier," Orthuber et al., Journal of the Optical Society of America, vol. 44, No. 4, April 1954, pages 297–299.